May 1, 1962      N. L. KENDT ETAL      3,032,291

RETRACTABLE ELECTRIC POWER CORD MECHANISM

Filed July 28, 1958      2 Sheets-Sheet 1

INVENTORS
NORMAN L. KENDT
& JOHN M. CORL

BY T.G. Dysart

THEIR ATTORNEY

INVENTORS
NORMAN L. KENDT
& JOHN M. CORL
BY T.G. Dysart
THEIR ATTORNEY

United States Patent Office 3,032,291
Patented May 1, 1962

3,032,291
RETRACTABLE ELECTRIC POWER CORD MECHANISM
Norman L. Kendt and John M. Corl, Louisville, Ky., assignors to General Electric Company, a corporation of New York
Filed July 28, 1958, Ser. No. 751,537
1 Claim. (Cl. 242—107)

This invention relates to retractable electric power cord mechanisms, and more particularly to a mechanism of this nature especially suited for movable or portable appliances.

An important object of this invention is to provide a retractable cord mechanism so arranged that the retracting force exerted on the cord varies in accordance with the length of cord withdrawn from the device with which the mechanism is associated.

Another object of the invention is to provide a retractable cord mechanism so arranged that the retracting force on the cord increases as the cord is retracted into its stored position.

Still another object of the invention is to provide a retractable cord mechanism including a cord reel so arranged that neither slip rings nor brushes are needed to transmit electric power from the reel to the stationary portion of the mechanism.

Further objects and advantages of the invention will become apparent as the following description proceeds, and the features of novelty which characterize the invention will be pointed out with particularity in the claims annexed to and forming a part of this specification.

Briefly stated, in accordance with one aspect of this invention there is provided a cord reel, an electric power cord secured at one end to the reel and wound thereon, a cable drum having a spiral peripheral surface of gradually increasing radius similar to an involute curve secured to the reel for rotation about the axis thereof, a cable secured to the reel adjacent the radially outermost portion of the spiral surface of the drum and trained over that surface, and spring means associated with the cable so as to apply a force tending to rotate the reel.

For a better understanding of this invention, reference may be made to the following description and the accompanying drawing in which.

Figure 1:
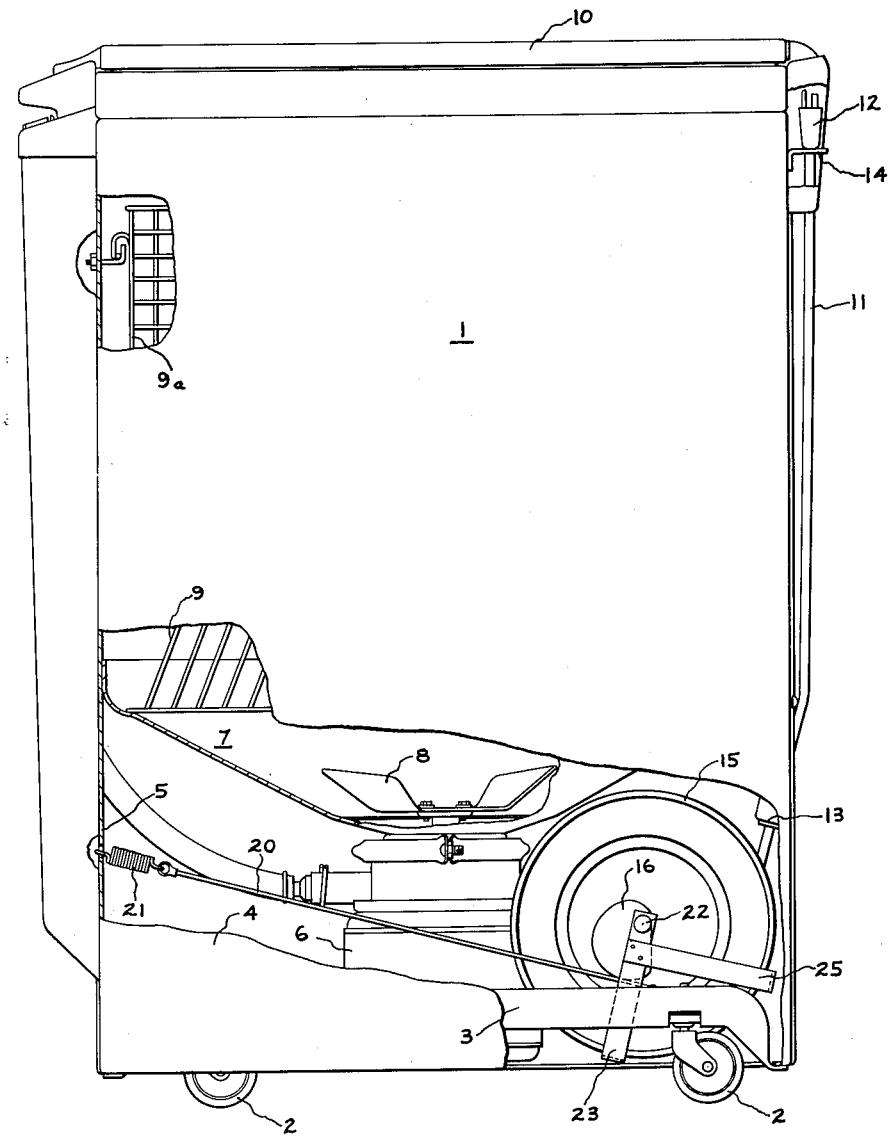
FIG. 1 is a side elevation view of a portable dishwasher embodying the present invention, some of the parts being broken away to show details of construction.

Referring now to the drawing, and in particular to FIG. 1 thereof, the numeral 1 designates a portable dishwasher in which an embodiment of the present invention is incorporated. Dishwasher 1 is mounted on a plurality of casters 2 so that it may be easily moved about the kitchen or other place of use. It will be understood that dishwashers of this type are ordinarily stored in one place when not in use, and wheeled to a point adjacent the kitchen sink when dishes are to be washed. Casters 2 are mounted on the frame of the dishwasher, the frame including frame member 3, side wall 4 and front wall 5 are major elements thereof. The lower portions of the walls of dishwasher 1, including walls 4 and 5, form a housing in which wash impeller motor 6 and the retractable cord mechanism of the present invention are located. The upper portions of the dishwasher walls form a washing compartment 7 within which is located a rotary wash impeller 8, and racks 9 and 9a. Dishwasher 1 also includes an inlet hose and an outlet hose (not shown) which are adapted to be operatively connected to a sink or the like during operation of the machine. A hinged top cover 10 provides access to the interior of washing compartment 7.

Having described the environment of the illustrated embodiment of our invention, the details of the embodiment itself will now be described. It will of course be understood that dishwasher 1 is intended for use in kitchens of various designs, and that hence a relatively long electric power cord is required so that the dishwasher may be connected to electric sockets mounted at varying distances and in various positions with respect to the kitchen sink. As shown in FIG. 1, an electric power cord 11 having a terminal plug 12 extends through a recessed aperture 13 in the rear wall of the dishwasher, a support bracket 14 having an opening therein to accommodate the cord being mounted near the upper edge of the rear portion of the dishwasher. Power cord 11 is secured at the end opposite its terminal plug end, by means of a strain relief clip 11a, to a reel 15 which is mounted on frame 3 within the housing formed by front, rear and side walls of the dishwasher. Conductors 11b loosely extend from the end of cord 11 in general alignment with the axis of reel 15, and are connected to fixed terminals (not shown) in the electrical circuit of the dishwasher. Thus conductors 11b are somewhat slack and free to twist and untwist as reel 15 rotates so that neither slip rings nor brushes are needed to transmit electric power from the reel to the appliance motor. It will of course be understood that cord 11 is wound on reel 15 when in its retracted position (shown in FIG. 1).

When dishwasher 1 is in use, it will be evident that there must be no retractive force pulling on terminal plug 12 after it has been plugged into an electrical outlet. At the same time it is necessary that some means be provided for retracting cord 11 into the dishwasher housing and on to reel 15, and it is desirable that this arrangement be simple in construction and automatic in operation. In accordance with the present invention, we have provided spring biased cable means for applying a rotative force to reel 15 which is fully overcome by the weight of cord 11 and friction between the cord and bracket 14 when it is withdrawn from reel 15 and plugged into an electrical outlet, but which rapidly overcomes opposing forces when cord 11 is lifted into generally vertical alignment with the apertures in bracket 14. Thus, when the terminal plug 12 is removed from an electrical outlet and moved to a position overlying the dishwasher the cord is rapidly and automatically retracted to its stored position.

The retracting means for accomplishing the foregoing mode of operation includes a cable drum 16 fixedly secured to reel 15 by pin 17 extending therethrough, for example, and arranged to rotate about the axis of the reel. Cable drum 16 includes an off-center spiral peripheral surface 18 extending radially outwardly from the axis of rotation, and also a cylindrical surface 19 of relatively small diameter shaped so as to merge into spiral surface 18. A cable 20 is secured at one end to reel 15 adjacent the radially outermost portion of spiral surface 18 and is trained over the spiral surface and around cylindrical surface 19. The other end of cable 20 is attached to suitable spring means, such as a coil spring 21 secured to front wall 5 of the dishwasher so as to apply a force to cable 20 tending to rotate reel 15 in a direction such that cord 11 is wound thereon.

Both reel 15 and cable drum 16 are supported for rotation on an axle pin 22 which is carried by a generally upright support arm 23 secured by screws or other suitable means to frame member 3. The lower end of support 23 is formed with a right angle portion 24 extending below reel 15 so as to prevent cord 11 from slipping off the reel when rapidly wound or unwound. Similarly, a guide element 25 having a guard portion 26 is fixedly secured to support member 23, guard 26 overlying the rear portion of the reel.

Figure 2:
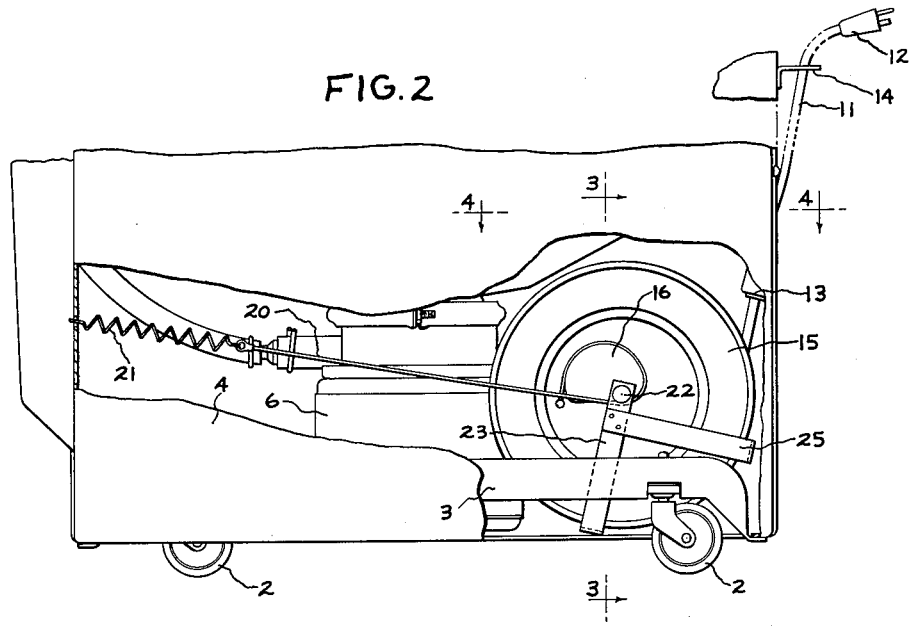
FIG. 2 is a fragmentary view of the dishwasher shown in FIG. 1, the parts being shown in a different position.
Figure 3:
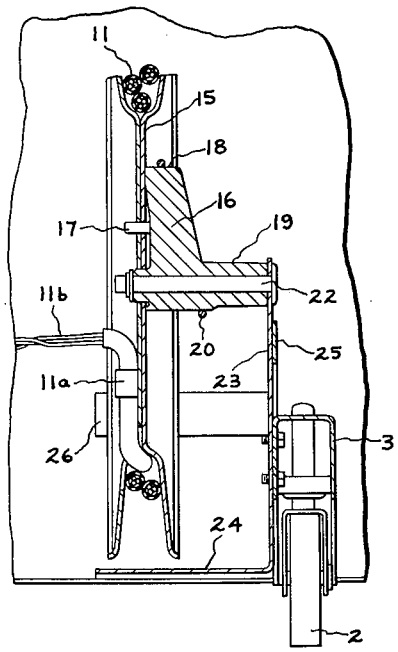
FIG. 3 is a cross-sectional view taken along the line 3—3 in FIG. 2.
Figure 4:
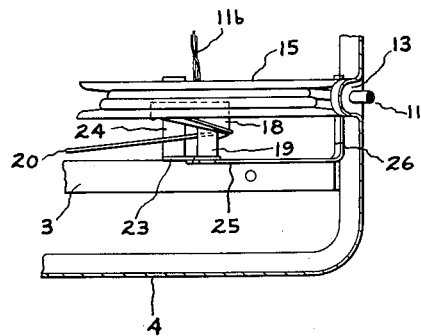
FIG. 4 is a cross-sectional view taken along the line 4—4 in FIG. 2.

In operation, it will be seen that the force applied to reel 15 by spring 21 acting through cable 20 is greatest when the parts are in position shown in FIG. 1 and is at a minimum when the parts are in the position shown in FIG. 2. In the former case the force is applied at a substantial distance from the axis of rotation of the reel, while in the latter case the force is applied along a line tangent to the surface of cylindrical surface 19, which is very close to the axis of rotation. Thus, a relatively substantial force must be overcome to withdraw cord 11 until reel 15 has been rotated to the position shown in FIG. 2, but thereafter very little force is required to continue to withdraw the cord, or to overcome the force of spring 21 tending to return the cord to the reel. In practice, the portion of cord 11 lying between bracket 14 and the electrical outlet into which terminal plug 12 is connected lies in a generally horizontal position, and the weight of the cord plus the friction between it and bracket 14 is sufficient to prevent its retraction into the dishwasher. However, when the cord is unplugged and lifted to a generally vertical position in alignment with bracket 14, spring 21 rotates the reel so as to retract the cord, and when cable 20 reaches the spiral surface 18 of drum 16 a rapidly increasing force is applied to the reel so that it is quickly retracted to the position shown in FIG. 1.

While we have shown and described a particular embodiment of our invention, we do not desire the invention to be limited to the particular construction disclosed, and we intend by the appended claim to cover all modifications within the true spirit and scope of our invention.

What we claim is:

A retractable cord mechanism comprising a frame, an electric power cord having a terminal plug on one end thereof, a reel mounted on said frame, said cord being wound on said reel and secured thereto at the other end thereof, a cable drum fixedly secured to said reel and rotatable about the pivotal axis thereof, said drum having an elongated cylindrical surface and an off-center spiral peripheral surface of gradually increasing radius extending radially outwardly from said cylindrical surface, a cable secured at one end to said reel adjacent the radially outermost portion of said spiral surface and trained over said spiral surface for less than one complete turn and around said cylindrical surface for several turns, spring means secured to said frame and to the other end of said cable so as to apply a force thereto tending to unwind the cable and rotate said reel to retract said cord, and a stationary guide member spaced from said reel and engageable with said terminal plug to limit the winding of said cord on said reel, said guide member having an opening formed therein to receive said cord, the edge of said guide member and said cord being in rubbing frictional engagement when said cord is withdrawn from said drum and extends non-axially of said guide opening to permit said terminal plug to be connected to a source of power, said cord and said guide member being substantially out of engagement when said cord is maintained so as to extend axially of said guide opening from said guide member, said spring means applying a force when said cord is withdrawn from said drum which is less than the force of said rubbing frictional engagement but great enough to rotate said reel when said rubbing frictional engagement is removed.

References Cited in the file of this patent

UNITED STATES PATENTS

| 281,446 | Brown | July 17, 1883 |
| 815,830 | Hopkins | Mar. 20, 1906 |
| 1,271,871 | Eleyet | July 9, 1918 |
| 1,904,000 | Hoyt | Apr. 18, 1933 |
| 2,110,433 | Yost | Mar. 8, 1938 |
| 2,391,141 | Dour et al. | Dec. 18, 1945 |
| 2,640,113 | Becker | May 26, 1953 |
| 2,678,188 | Rogers | May 11, 1954 |
| 2,680,004 | Herker | June 1, 1954 |